United States Patent
Maybee et al.

(10) Patent No.: US 10,169,199 B2
(45) Date of Patent: Jan. 1, 2019

(54) AUTOMATIC MODEL-SPECIFIC DEBUGGER EXTENSIONS

(75) Inventors: Paul Maybee, Seattle, WA (US); Johan Marien, Sammamish, WA (US); Brian Crawford, Seattle, WA (US); John Cunningham, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2333 days.

(21) Appl. No.: 12/136,053

(22) Filed: Jun. 10, 2008

(65) Prior Publication Data

US 2009/0307652 A1    Dec. 10, 2009

(51) Int. Cl.
  *G06F 9/44*    (2018.01)
  *G06F 11/36*    (2006.01)

(52) U.S. Cl.
  CPC ............... *G06F 11/3644* (2013.01)

(58) Field of Classification Search
  CPC ................................... G06F 11/3644
  USPC ........................................ 717/125
  See application file for complete search history.

(56) References Cited

U.S. PATENT DOCUMENTS

| | | | |
|---|---|---|---|
| 5,774,729 A * | 6/1998 | Carney et al. | 717/126 |
| 5,953,534 A * | 9/1999 | Romer et al. | 717/138 |
| 5,958,049 A | 9/1999 | Mealey et al. | |
| 6,324,683 B1 | 11/2001 | Fuh et al. | |
| 6,353,923 B1 * | 3/2002 | Bogle et al. | 717/128 |
| 6,671,875 B1 * | 12/2003 | Lindsey et al. | 717/129 |
| 6,839,892 B2 | 1/2005 | Dawkins et al. | |
| 7,107,578 B1 * | 9/2006 | Alpern | 717/124 |
| 7,113,942 B2 | 9/2006 | Levanoni et al. | |
| 7,117,483 B2 | 10/2006 | Dorr et al. | |
| 7,133,820 B2 | 11/2006 | Pennello et al. | |
| 7,203,926 B2 | 4/2007 | Bogle et al. | |
| 7,293,256 B2 | 11/2007 | Crawford | |
| 7,343,589 B2 | 3/2008 | Ringseth et al. | |
| 7,350,194 B1 * | 3/2008 | Alpern | 717/124 |
| 7,370,333 B2 | 5/2008 | Mehta et al. | |
| 7,412,513 B2 | 8/2008 | Levanoni et al. | |
| 7,418,697 B2 | 8/2008 | Gryko et al. | |
| 7,496,895 B1 * | 2/2009 | Mosterman et al. | 717/124 |
| 7,516,441 B2 | 4/2009 | Hamilton et al. | |
| 7,665,093 B2 | 2/2010 | Maybee et al. | |
| 7,770,183 B2 | 8/2010 | Pietrek et al. | |
| 7,873,507 B2 * | 1/2011 | Tatsuoka et al. | 703/21 |
| 7,954,088 B2 | 5/2011 | Crawford | |

(Continued)

OTHER PUBLICATIONS

"RealView Debugger Extensions", Version 1.0, User Guide, Date: Sep. 2002, ARM Limited, p. 1-224.

(Continued)

*Primary Examiner* — Evral E Bodden
(74) *Attorney, Agent, or Firm* — Ogilvie Law Firm (57) ABSTRACT

Extensions to a debugger are identified in a debugger database which is read automatically when the debugger loads. The debugger watches for trigger events in its execution environment and optionally for load conditions in a debuggee program's internal state. If a trigger event occurs and a load condition is met, then the debugger automatically loads an extension for use. Some extensions provide debugging routines that are specifically designed to support debugging of applications which use a specific programming model.

20 Claims, 5 Drawing Sheets

(56) References Cited

U.S. PATENT DOCUMENTS

| | | | |
|---|---|---|---|
| 8,028,007 | B2 | 9/2011 | Levanoni et al. |
| 8,135,572 | B2 | 3/2012 | Crawford et al. |
| 8,156,476 | B2 | 4/2012 | Maybee et al. |
| 8,365,149 | B2 * | 1/2013 | Frank et al. ............ 717/125 |
| 8,412,744 | B2 | 4/2013 | Dutta et al. |
| 8,412,984 | B2 | 4/2013 | Maybee et al. |
| 8,429,553 | B2 | 4/2013 | Maybee et al. |
| 8,516,498 | B2 | 8/2013 | Mehta et al. |
| 8,522,217 | B2 | 8/2013 | Dutta et al. |
| 8,566,647 | B2 | 10/2013 | Maybee et al. |
| 8,589,885 | B2 | 11/2013 | Maybee et al. |
| 8,595,702 | B2 | 11/2013 | Maybee et al. |
| 8,606,843 | B2 | 12/2013 | Mehta et al. |
| 8,645,920 | B2 | 2/2014 | Maybee |
| 8,677,186 | B2 | 3/2014 | Maybee et al. |
| 8,689,196 | B2 | 4/2014 | Maybee et al. |
| 8,745,596 | B2 | 6/2014 | Maybee |
| 8,849,691 | B2 | 9/2014 | Sanabria et al. |
| 2003/0188042 | A1 * | 10/2003 | Anaya et al. ............ 709/318 |
| 2005/0240902 | A1 | 10/2005 | Bunker et al. |
| 2006/0136914 | A1 | 6/2006 | Marascio et al. |
| 2007/0156486 | A1 | 7/2007 | Sanabria et al. |
| 2007/0156487 | A1 | 7/2007 | Sanabria et al. |
| 2010/0162212 | A1 | 6/2010 | Stall et al. |
| 2011/0154301 | A1 * | 6/2011 | Klinker et al. ............ 717/135 |
| 2011/0321001 | A1 | 12/2011 | Dutta et al. |
| 2012/0159444 | A1 | 6/2012 | Agarwal et al. |
| 2014/0068569 | A1 | 3/2014 | Goldin et al. |
| 2014/0173564 | A1 | 6/2014 | Crawford et al. |

OTHER PUBLICATIONS

"Advanced Driver Debugging", Copyright: 2005 Microsoft Corporation, http://download.microsoft.com/download/f/0/5/f05a42ce-575b-4c60-82d6-208d3754b2d6/Adv-Drv_Debug.ppt#290,5, Documentation.

Markus Michael Geipel, "Run-Time Development and Configuration of Dynamic Service Networks", Date: Jun. 2004, pp. 1-53.

Paul Maybee, "NeD: The Network Extensible Debugger", Summer '92 USENIX Proceedings, pp. 145-153, Jun. 1992.

"Debugger Extensions", Retrieved at <<http://msdn2.microsoft.com/en-us/library/aa935645(printer).aspx>>, Mar. 24, 2008, 1 page.

"Parallel programming model", Retrieved at <<http://en.wikipedia.org/wiki/Parallel_programming_model#Example_parallel_programming_models>> (highlighting added), Oct. 12, 2012, 4 pages.

"Beginning Game Programming Languages—Game Development", Retrieved at >>http://gamedev.stackexchange.com/questions/13659/beginning-game-programming-languages>> (highlighting added), Jun. 14-Jun. 20, 2011, 6 pages.

"Event-driven programming", Retrieved at <<http://en.wikipedia.org/wiki/Event-driven_programming>> (highlighting added), Nov. 13, 2012, 4 pages.

"SMS application framework by ActiveXperts Software", Retrieved at <<http://www.activexperts.com/mmserver/>> (highlighting added), copyright date 2012, 4 pages.

"Mobile Software Development: Which programming language is most suitable to develop apps for smartphones?—Quora", Retrieved at <<http://www.quora.com/Mobile-Software-Development/Which-programming-language-is-most-suitable-to-develop-apps-for-smartphones>> (highlighting added), Aug. 20, 2011, 2 pages.

Phillip Power, "Programming Models (an introduction) | Paralant", Retrieved at <<http://www.paralant.com/blog/programming-models-an-introduction/>> (highlighting added), Aug. 25, 2012, 2 pages.

Paul Maybee, "NeD: The Network Extensible Debugger", Proceedings of the Summer 1992 USENIX Conference, San Antonio, TX, Jun. 8-12, 1992, 12 pages.

Paul Maybee, "Pdb: A Network Oriented Symbolic Debugger", Proceedings of the Winter 1990 USENIX Conference, Washington D.C., Jan. 22-26, 1990, 12 pages.

P.K. Harter, et al., "DCS: A System for Distributed Computing Support", University of Colorado, Department of Computer Science Technical Report CU-CS-309-85, 1985, 64 pages.

"Microsoft Visual Studio Debugger", retrieved from <<https://en.wikipedia.org/wiki/Microsoft_Visual_Studio_Debugger>>, Oct. 14, 2013, 2 pages.

"CodeView", retrieved from <<https://en.wikipedia.org/wiki/CodeView>>, Mar. 18, 2014, 3 pages.

"Eclipse (software)", retrieved from <<https://en.wikipedia.org/wiki/Eclipse_(software)>>, Feb. 1, 2016, 9 pages.

"LLDB (debugger)", retrieved from <<https://en.wikipedia.org/wiki/LLDB_(debugger)>>, Oct. 15, 2015, 2 pages.

"GNU Debugger", retrieved from <<https://en.wikipedia.org/wiki/GNU_Debugger>>, Jan. 9, 2016, 7 pages.

"Debugger", retrieved from <<https://en.wikipedia.org/wiki/Debugger>>, Nov. 6, 2015, 5 pages.

"Android software development", retrieved from <<https://en.wikipedia.org/wiki/Android_software_development>>, Jan. 29, 2016, 13 pages.

"TotalView for HPC Features", retrieved from <<http://www.roguewave.com/products-services/totalview/features>>, © 2016, 4 pages.

* cited by examiner

AUTOMATIC MODEL-SPECIFIC DEBUGGER EXTENSIONS

BACKGROUND

A debugger is a computer program used to test and debug other programs, which are referred to as debuggee programs or simply as "debuggees". Debuggers generally have a fixed set of commands or interfaces. Low-level debuggers show a developer debuggee assembly code or machine code during debugging, while source-level debuggers show debuggee source code. A debugger generally provides a software developer with some control over debuggee execution, such as pausing execution to examine the debuggee's variables and other internal state information, stepping through debuggee code line-by-line, and setting a breakpoint to stop debuggee execution when a specified condition occurs within the debuggee. Some debuggers also allow a developer to modify the debuggee's internal state during debugging by setting variables, instead of merely observing the internal state.

Most debuggers provide command line user interfaces, for enhanced portability and decreased computing resource requirements. However, some debuggers have compatible front-ends that interact with their command line user interface. For example, a front-end may integrate a debugger with an Integrated Development Environment, and a front-end may provide graphics or visualization capabilities to users.

SUMMARY

In some embodiments, a debugger extension includes debugger viewing and manipulation routines that support and are specific to a particular programming model. For example, the debugger extension might be tailored for use in debugging software that follows a multicore programming model, a game development programming model, a custom hardware programming model, a presentation programming model, a web application programming model, or a handheld device programming model, among others. Debugger extensions accordingly expand the debuggee symbols and semantics accessible to a debugger engine manager, and hence are loaded at or near the debugger engine level, rather than being loaded closer to the user interface level.

A published record, such as a registry entry, associates an identification of the debugger extension with a description of a debugger environment trigger event, such as the loading of a specified library. If the trigger event occurs in the debugger's execution environment, then the debugger extension is automatically loaded for use with the debugger to assist in debugging software written in the extension's supported programming model(s). One or more debugger extensions may be automatically loaded in this manner.

In some embodiments, the debugger extension is loaded only if the trigger event occurs in the debugger's execution environment and if a debuggee program state load condition is also met. For example, the load condition may specify that the debugger extension should be loaded only if the debuggee makes a particular kernel call, accesses a particular file or port, or reaches a particular point while executing debuggee code.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Debuggers generally have a fixed set of commands or interfaces that support viewing and analyzing a debuggee program's state using an inherent programming model which reflects the underlying machine architecture and operating system. That is, the choice of which programming model is supported by a debugger is generally made by the debugger's developer, and the choice of programming model is hard-coded in assumptions scattered throughout the debugger's implementation.

However, modern applications and other software programs typically are written using a variety of commercial or third-party libraries and components, each of which may add another programming model to the software. A debugger may recognize some symbolic information for some of these models, e.g., a debugger may some knowledge of the layout of public data structures of a programming model. But a typical debugger does not have adequate knowledge of how various programming models are used and how aspects of the various programming models interact with the rest of the program that is being debugged.

Some debuggers provide an ability to extend debugging functionality by explicitly (manually or by application-developer-written script) loading extension packages or scripts. This explicit approach to enhancing debuggers could perhaps allow some support for additional programming models to be added to a debugger. But explicit loading clearly fails when each debugger user is left with the problem of first identifying which extension or script is appropriate, and with the need to understand the process of loading extensions or executing scripts in the particular debugger being used.

By contrast, some embodiments described herein provide or use a mechanism to automatically extend the capabilities of a debugger, and in particular, to automatically load debugger extensions when it is appropriate—as previously determined by a knowledgeable developer—to do so. When software is loaded onto a system, the software installation process publishes a debugger extension for the debugger, describing the extension artifacts (e.g., libraries, components, script files) and also specifying the circumstances under which the debugger extension should load. The load circumstances may be as simple as "load when my component loads", but one may also specify a more complex query involving the debuggee program's internal state. When the specified circumstances occur, the debugger automatically loads the extension. As discussed herein, extensions may also provide programming-model-specific debugging routines.

As an example, suppose that an application program is written using a library that implements coroutines. Suppose also that the debugger the application developer is using has no inherent understanding of the coroutine library or how the coroutine library manipulates the program stack. As a result, the debugger provides the application developer with little or no insight into the execution progress of any path that isn't currently executing on a coroutine's thread.

But suppose the coroutine library developers also supply a debugger extension that understands the internal structure of the coroutine library and reflects that understanding in coroutine viewing and manipulation facilities to be loaded by the debugger. As a result, application developers will have programming-model-specific support in their debuggers, making the debugging of coroutine applications significantly easier. As also discussed herein, an application developer can be given access to coroutine debugging support automatically after beginning to debug a coroutine application.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

Whenever reference is made to data or instructions, it is understood that these items configure a computer-readable memory, as opposed to simply existing on paper, in a programmer's mind, or as a transitory signal on a wire, for example.

Operating Environments

Figure 1:
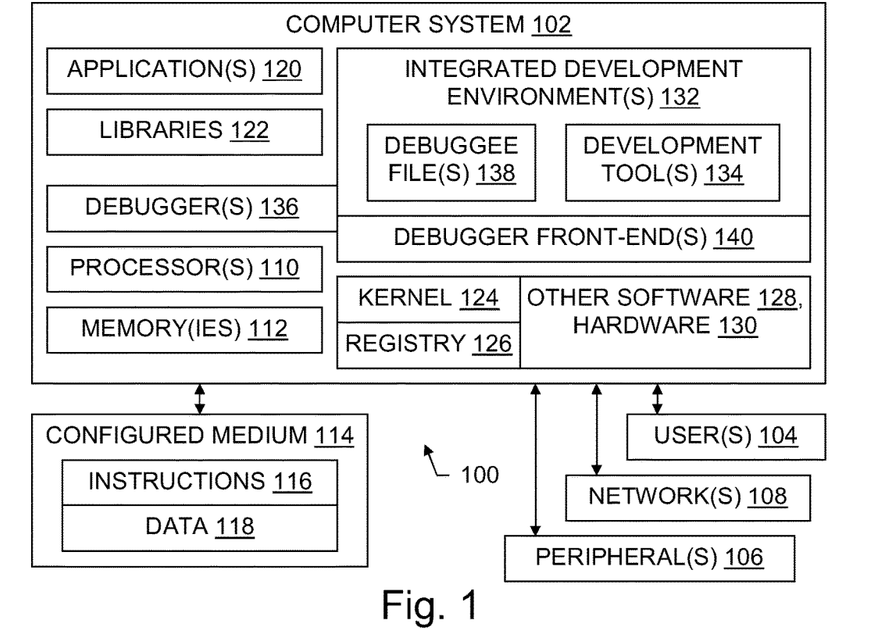
FIG. 1 is a block diagram illustrating a computer system in an operating environment, and configured storage medium embodiments.

With reference to FIG. 1, an operating environment 100 for an embodiment may include, for instance, a computer system 102, which may be multithreaded or not, and multiprocessor or not. An operating environment may include one or more computer systems, which may be clustered, client-server networked, and/or peer-to-peer networked. Some operating environments include a stand-alone (non-networked) computer system.

Human users 104 may interact with the computer system 102 or with another computer system in an embodiment by using screens, keyboards, and other peripherals 106. A software developer is understood to be a particular type of user 104; end-users are also considered users 104. Some examples of software developer users 104 include application program developers, debugger developers, and developers of libraries or other components that provide programming-model-specific code. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system 102 when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that applications 120 and other items shown in the Figures may reside partially or entirely within one or more memories 112, thereby configuring those memories.

In a given operating environment, the computer system 102 or another computer system may be configured with and/or run one or more software applications 120 which may contain components such as libraries 122, public interfaces, class instantiations, drivers, and interrupt handlers. One or more operating systems, hypervisors, or other kernels 124 will generally be present. Some systems include a system registry 126, such as a Microsoft® system registry. Other software 128 and hardware 130 other than that already enumerated may also be present.

In some configurations an Integrated Development Environment 132 is present, providing development tools 134 such as source code editors, source code version control managers, interpreters and compilers, and debuggers 136. Programs being debugged may include a variety of debuggee files 138, such as files containing source code, assembly code, machine code, symbol tables, execution logs or snapshots, developer annotations, and so on. The debugger 136 may be configured with a front-end 140, such as a graphical user interface front-end.

Some of the suitable operating environments for some embodiments include a Microsoft® Visual Studio® development environment (marks of Microsoft Corporation). Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs. In particular, although application program debugging is used as an example, embodiments may be useful in debugging other types of software as well, such as kernels 124 and libraries 122.

Systems

Figure 2:
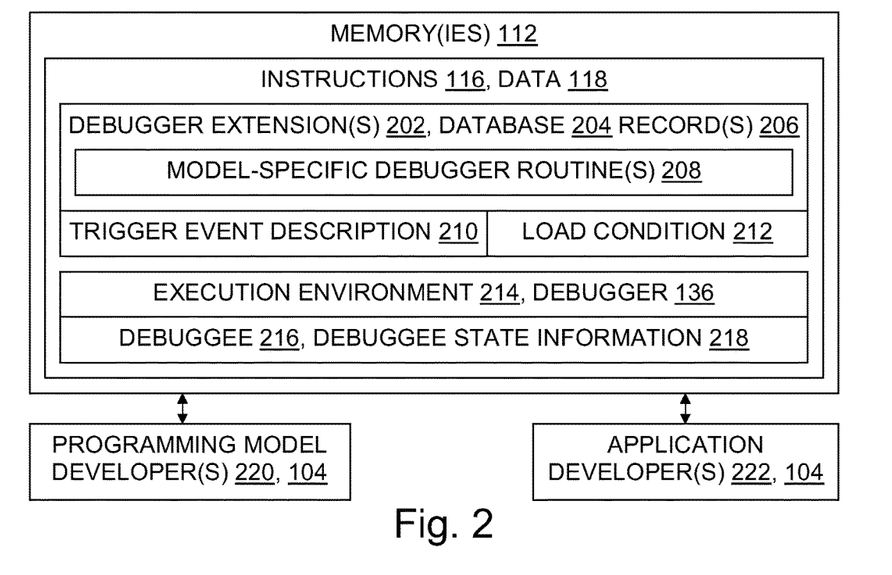
FIG. 2 is a block diagram further illustrating a computer system memory configured with one or more debugger extensions, trigger event descriptions, load conditions, a debugger, a debuggee, and other items related to debugging software.

Referring now to FIGS. 1 and 2, some embodiments provide a computer system 102 configured for automatic loading of a model-specific debugger extension 202. The system includes a memory 112, and a logical processor 110 in operable communication with the memory. A debuggee 216 program resides in, and hence configures, the memory 112. A debugger 136 is attached to the debuggee program. The debugger 136 is configured with instructions 116 to determine whether a debugger environment trigger event provided in a description 210 has occurred in the debugger's execution environment 214. The trigger event description 210 is read from a record 206 of a debugger extension database 204, such as a portion of a system registry 126. Loading of the debugger extension 202 may also be contingent on a load condition 212 being met in the debuggee program's internal state information 218. Thus, a programming model developer 220, namely, a person who understands a programming model and what capabilities are most useful when debugging software written according to the programming model, can encapsulate that knowledge and provide it to application developers 222 in the form of a debugger extension 202 for the programming model.

The debugger extension 202 configures the memory and includes debugger viewing routines 208 (and possibly also manipulation routines 208) that are specific to a particular programming model. The debugger routines in the debugger extension 202 are designed for viewing (and possibly also manipulating) state information 218 of the debuggee program via the debugger. State information 218 may include, for example, variables, executable instructions, register contents, memory contents, and the properties of items such as classes, objects, components, modules, tasks, or threads.

In some embodiments, the debugger 136 is configured to automatically load the debugger extension and pass control to the debugger extension 202 in response to an occurrence of the trigger event. In some, the debugger 136 is configured to determine whether a debuggee 216 program state load condition 212 is met, and to automatically load the debugger extension 202 and pass control to the debugger extension after the trigger event occurs and the load condition is also met.

In some embodiments, multiple exemplars of an item shown in the Figures are present configuring the system 102. For example, in one embodiment, the debugger extension 202 includes debugger viewing and manipulation routines 208 that are specific to a first programming model, and the system also includes in memory 112 a second debugger extension 202 that includes debugger viewing and manipulation routines 208 that are specific to a second programming model. That is, two debugger extensions 202 are present somewhere in the system, for two different programming models, although the two debugger extensions are not necessarily loaded as yet by the debugger 136.

In particular, in some embodiments the debuggee 216 program has a first portion implemented using a first programming model and a second portion implemented using a second programming model, one debugger extension 202 includes routines 208 that are specific to the first programming model, a second debugger extension 202 includes routines 208 that are specific to the second programming model, and both debugger extensions 202 are loaded and ready for use in debugging the same debuggee 216 program. That is, a developer 222 may use two automatically loaded debugger extensions 202 to help debug a program that uses two different programming models. A debuggee may contain code written according to one or more programming models;

a debuggee using two models is merely an example. Also, a given debugger extension 202 may provide routines 208 for two or more programming models.

In some embodiments, the system includes a persistent debugger extension database 204, which identifies debugger extensions and corresponding trigger events. For example, the persistent debugger extension database 204 may be part of a system registry 126. In particular and without excluding other approaches, the database 204 may include registry records 206 that are similar in format to the Microsoft® system registry entries that have been used to track application 120 versions, libraries 122, and hardware 130 in computer systems.

Figure 3:
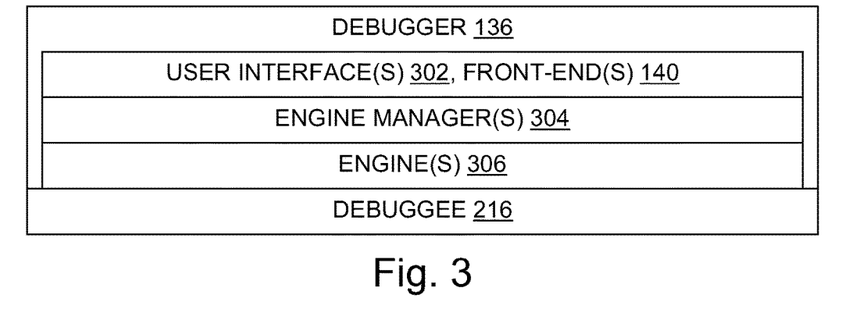
FIG. 3 is a block diagram illustrating a configuration in which debugger extensions are not present.

With reference to FIG. 3, some debuggers 136 include a user interface 302, such as a command line interface, which may have been supplemented with a graphical user interface and/or other front-end 140, for example. The user interface handles communications between a developer and a debugger engine manager 304. The engine manager 304 translates between symbolic information such as compiler-generated symbol tables and memory characterizations (stack, heap, I/O port, etc.), on the one hand, and machine-specific or other low-level information such as memory addresses and instruction pointer values, on the other hand. The engine manager 304 communicates with a debugger engine 306 tailored to a specific machine architecture and/or a specific execution environment. The debugger engine 306 communicates with an executable version of the debuggee 216. For convenient reference, the interface 302 is said to be "above" the engine manager 304, which in turn is above the engine 306.

It will be appreciated that FIG. 3 illustrates only one of the possible debugger architectures, and that particular configurations may depart from the example shown in FIG. 3. For instance, an engine 306 may incorporate knowledge of some symbolic information or even be merged with the engine manager. Similarly, the user interface may read some debuggee files 138, such as source code files, without going through the engine manager or the engine.

Figure 4:
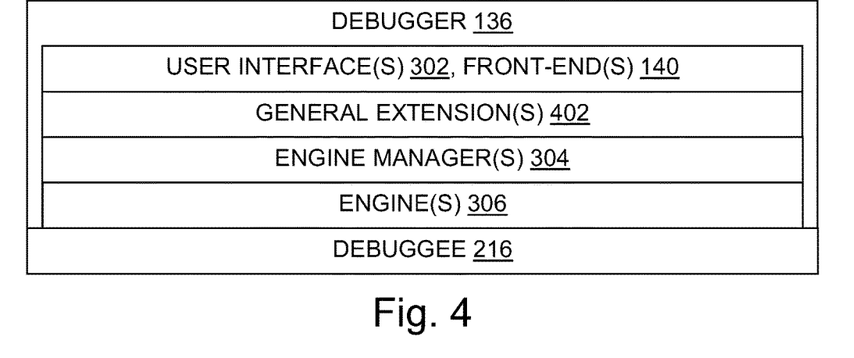
FIG. 4 is a block diagram illustrating a configuration in which a general extension is present between a user interface level and an engine manager level of a debugger.

FIG. 4 illustrates a configuration which departs from FIG. 3 by the addition of one or more general extensions 402 to the debugger 136. The general extensions 402 are manually identified to the debugger 136 by the developer who is using the debugger 136. The identified general extensions 402 are then loaded manually in response to a command given by the developer to the debugger through the debugger's user interface 302. General extensions 402 provide access to debuggee 216 state information 218, such as variable values, but general extensions 402 provide little or no adequate information about aspects of the debuggee 216 that are programming-model-specific.

Figure 5:
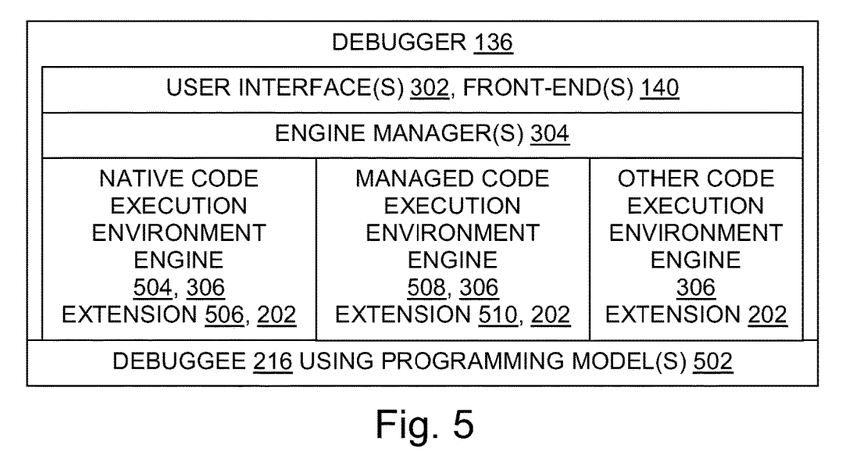
FIG. 5 is a block diagram illustrating a configuration in which one or more programming-model-specific debugger extensions are present, adjacent to and/or within an engine level of a debugger.

FIG. 5 shows an embodiment wherein a debugger 136 includes a user interface 302, again possibly supplemented by a front-end 140. At least one engine manager 304 is located "below" the user interface 302, that is, located in terms of debugging data and control flow somewhere between the user interface 302 and a debuggee 216 program. At least one debugger engine 306 is located below the engine manager 304, and a debugger extension 202 is loaded in memory at a location between the engine manager 304 and the debuggee program.

Notice that the debugger extension 202 loads below the engine manager (e.g., below the Microsoft® Visual Studio® session debug manager), unlike general extensions 402, which are loaded above the engine manager as shown in FIG. 4. The difference in load location corresponds to the presence/absence of programming-model-specific support in an extension 202/402, respectively.

However, the difference in extension load location is independent of the manual/automatic mechanism used to load an extension of either kind (general or programming-model-specific). That is, automatic loading of an extension using a trigger event description 210 and/or a load condition 212 with a debugger extension database 204 as described herein may be utilized in a given configuration to load general extensions 402, to load programming-model-specific debugger extensions 202, or to load both.

With continued reference to FIG. 5, in the illustrated example the debugger 136 includes a native code engine 504 (a type of engine 306) for a native code execution environment, e.g., one at the stack and register level, and similarly includes a managed code engine 508 for a managed code execution environment, e.g., one having a memory garbage collection object. A native code debugger extension 506 (a type of programming-model-specific debugger extension 202) is loaded below the engine manager 304 for viewing and manipulating state information of debuggee 216 program code which runs in the native code execution environment. Similarly, a managed code debugger extension 510 is loaded below the engine manager 304 for viewing and manipulating state information of the debuggee 216 program code which runs in the managed code execution environment.

Thus, debugger extensions 202 can be used to debug across two or more frameworks. Native code and managed code are merely examples of programming model frameworks. Other framework execution environments for which debugger extensions 202 could be developed include script environments, SQL environments, and any environment tailored to a programming model 502 that lies within at least one of the following categories: coroutine programming models, multicore programming models, parallel programming models, game development programming models, custom hardware programming models, GUI programming models, presentation programming models, event-driven programming models, messaging framework programming models, wide area network programming models, web application programming models, rich internet application programming models, handheld device programming models, cell phone programming models, database programming models, managed execution environment programming models, native code programming models, script programming models.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Visual Studio® Debugger Example

Examples given within this document do not describe all possible embodiments. Embodiments are not limited to the specific programs or scenarios provided herein. A given embodiment may include additional programs, different program languages, different program mechanisms, different data structures, and/or otherwise depart from the examples provided.

Bearing in mind the foregoing caveats, we now consider an example discussing automatic loading of debugger extensions into the Microsoft® Visual Studio® Debugger, as an example of loading extensions into a debugger 136.

At any time during or after the installation of a software component such as an application 120 or a library 122, for instance, an extension for that component may be registered in a persistent Debugger Extension Database (DED) which is an example of a debugger extension database 204. The DED contains an extensions schema, such as a table with columns for a trigger event description 210, a load condition 212, and a debugger extension 202 description. The trigger event is any debugger recognizable event; common values would perhaps be "debugger attached", or "dynamic library loaded". The optional load condition is a query against the debuggee state information 218, and may be authored in the debugger's scripting language. The extension description is a reference identifying an extension. The extension contains instructions 116 and data 118 written in a format supported by the debugger, for example, an extension may be identified by a dynamic library name or the class-id of a COM component.

At startup the debugger loads the table of records 206 from the database. When the debugger later attaches to a debuggee 216 process, the debugger 136 begins receiving events based on state changes in the debuggee. If one of these events matches any trigger event description then the debugger evaluates the load condition 212. If the load condition is true, or if the load condition is absent from the database record 206, then the debugger loads the extension based on the extension description. That is, an omitted load condition is treated as equivalent to a load condition that is always met, i.e., always true. The debugger user interface 302 is notified that a new extension is loaded, so that the debugger user 104 can be notified. If the load condition is false, then the debuggee simply continues to be executed by the debugger and the debugger watches for trigger events as it receives future events. If the load condition ever evaluates true then the extension load occurs.

One or more debugger extensions 202 may be loaded for an application 120 that is being debugged, supporting one or more programming models 502 used in an application. Each application 120 being debugged may thus have debugger functionality available that matches the set of software technologies used to construct that application. Extensions may be provided most commonly by programming model developers 220, but that need not be the source of every extension. Over time new support may become available for existing programming models, in the form of upgraded or new debugger extensions 202. When this occurs the debugger 136 environment for applications 120 written to these programming models automatically becomes richer.

Figure 6:
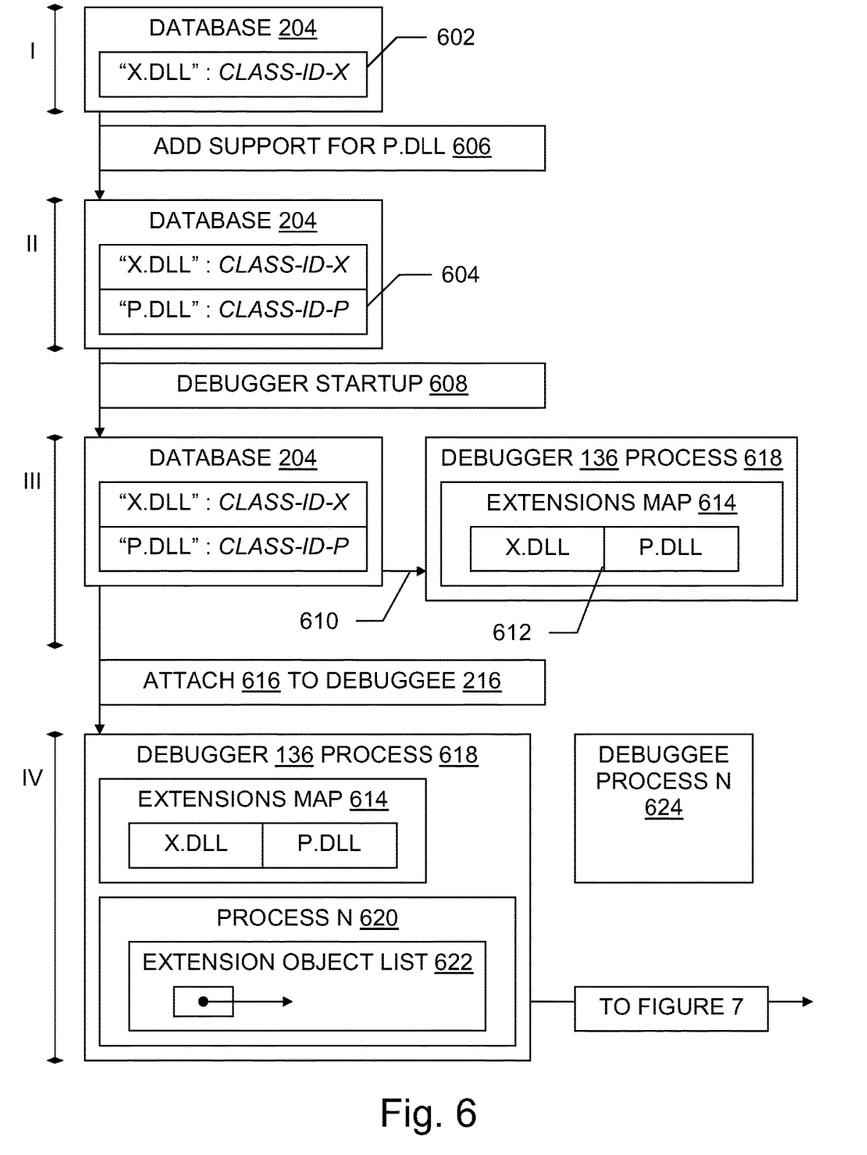
FIGS. 6 and 7 together are a data flow diagram illustrating some embodiments for automatically loading extensions into a debugger.
Figure 7:
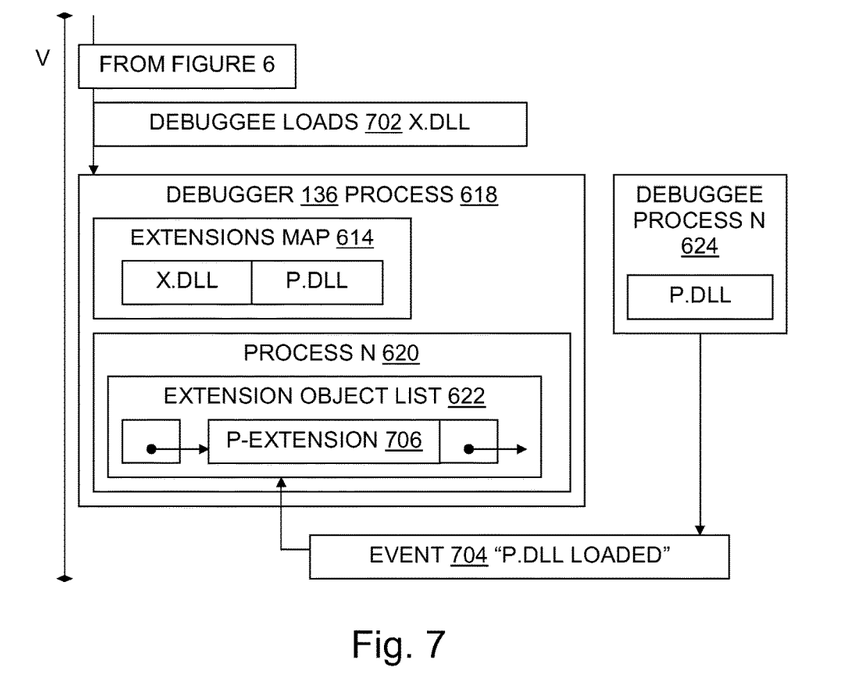

With reference to FIGS. 6 and 7, an implementation of this approach in a Microsoft® Windows® environment using the Visual Studio® Debugger is as follows. The DED is located under the debugger hive in the system registry 126. Each entry in the DED is a record 206 in the form of a key-value pair 602. The key serves as the trigger event description 210 and the value provides the extension description. The key is simply a dynamically loadable library (DLL) name, indicating a module load trigger event that occurs when the named DLL is loaded. In the FIG. 6 example, the key is "X.DLL". The value 604 is the class-id of a COM object implementing the corresponding extension. There are no load conditions 212 in this implementation, so the implication is that the COM object always loads into the debugger 136 following a debuggee 216 load of the DLL. On installation of software following a specific programming model 502, a debugger extension 202 supporting debugging of that aspect of the software is added 606 to the list of available extensions in the registry 126, as illustrated in state I and state II of FIG. 6.

When the Visual Studio® Debugger package loads and starts up 608, the debugger 136 reads 610 all key value pairs into list elements 612 placed in an in-memory ExtensionsMap data structure 614, as illustrated in states II and III of FIG. 6.

When the debugger process 618 attaches 616 to a debuggee process 620, the debugger 136 initializes an empty list 622 of extension objects (ExtensionObjList) for that debuggee process, as illustrated in states III and IV of FIG. 6. At each module load event for the debuggee the debugger searches the ExtensionsMap for the name of the loaded module. When the debuggee loads 702 the X.DLL file, the trigger event occurs, as the search finds the module X.DLL in the ExtensionsMap data structure 614. The debugger CoCreates a COM object 624 with the P.DLL class-id that is associated with the X.DLL module name. The debugger adds the object in a list element for P-EXTENSION 706 at the end of the ExtensionObjList, as illustrated in state V of FIG. 7. The debugger 136 then raises an ExtensionLoadedEvent in step 704 to the debugger user interface 302 informing the user interface that a new extension has been loaded. The debugger also makes the list of extensions available via a query on its Process 620 object:

HRESULT Process::GetExtension([in] UUID interfaceId, [out] EnumIUnknowns** ppEnum);

The query returns an enumerator for any loaded extension that implements the interface indentified by interfaceId.

Methods Overview

Figure 8:
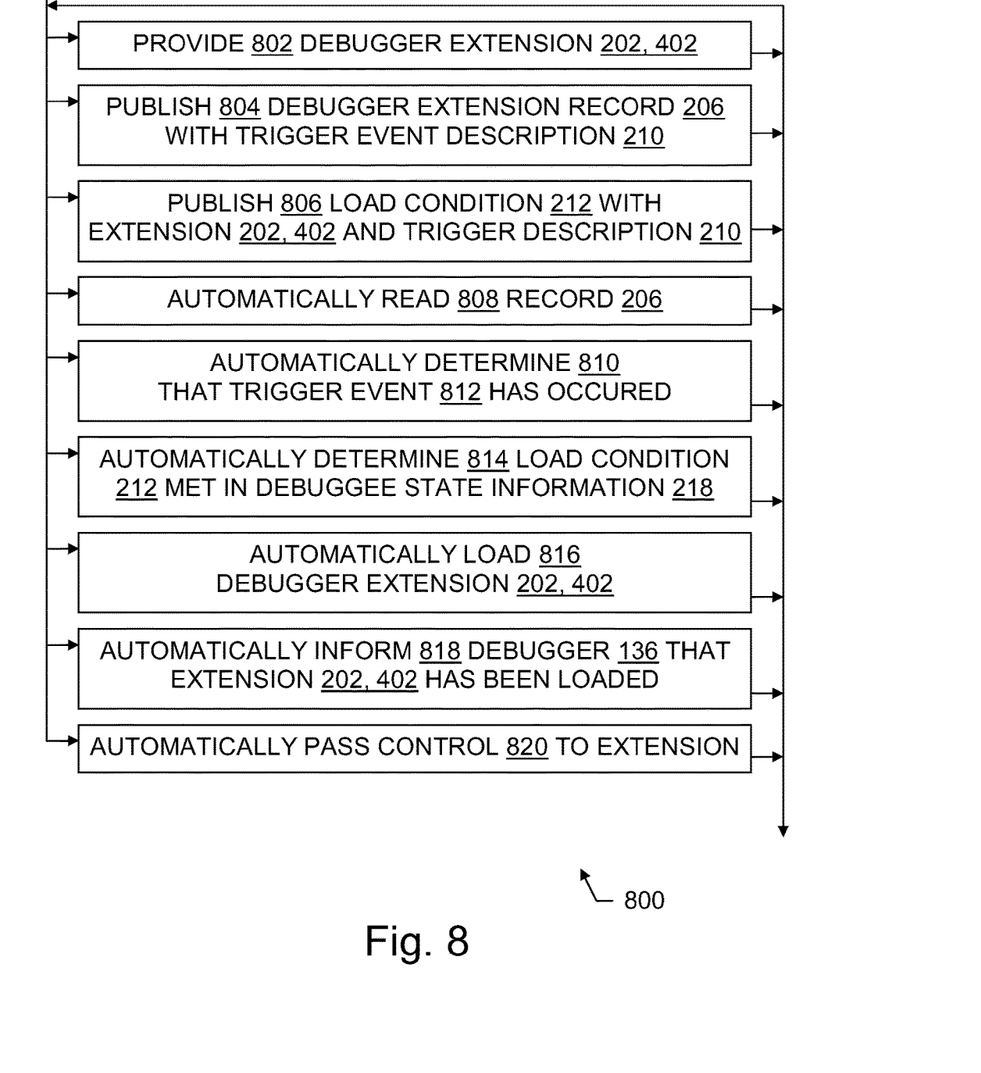
FIG. 8 is a flow chart illustrating steps of some method and configured storage medium embodiments.

FIG. 8 illustrates some method embodiments in a flowchart 800. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 800 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a providing step 802, a library 122 designer or other software developer (or code acting on behalf of a developer) provides an extension such as a programmingmodel-specific debugger extension 202 or a general extension 402. Step 802 may be accomplished by creating a new file or modifying an existing file, with code presented in a format that is compatible with at least one debugger 136, to include at least one routine (such as a routine 208) for at least viewing debuggee state information 218 in the debugger. Step 802 may include specifying an entry point or an API for the extension. The specific instructions 116 and data 118 used in extension 202 routine(s) 208 will depend on the specific programming model 502 supported by the extension, but in general a developer who is familiar with the programming model 502 by virtue of having developed it and/or having worked extensively with it will be able to develop corresponding extension routines in a form consistent with the teachings herein.

During an extension publishing step 804, the extension (which may be a model-specific debugger extension 202 or a general extension 402) is published, together with at least a trigger event description 210. In some cases, a load condition 212 is published 806 with the extension and the trigger event description 210. Publication 804, 806 may be accomplished, for example, by placing into a database 204 of extensions a record 206 containing an identification of the extension, the trigger event description 210, and (optionally) the load condition 212. Performing publishing step 806 also performs publishing step 804. In FIG. 6, step 606 of adding support for P.DLL is an example of publishing step 804.

In some embodiments, it may be considered that only a load condition is published; that is, one might say that no trigger event is published. But it is expected in practice that there will always be at least one implicit trigger event, namely, the debugger loading a debuggee.

With continued reference to FIG. 8, during an automatic reading step 808 a record 206 is automatically read from a database 204 by the debugger 136. In FIG. 6, the registry reading step 610 is an example of reading step 808.

As used herein with regard to step 808 and other steps, "automatically" or "automatic" means without requiring I/O interaction with a human user 104 immediately prior to the automatically performed step in order to accomplish that step. Stated differently, programmed action which is contingent on human input from a dialog box or command line, for example, is not performed "automatically" even though it is partially automated by virtue of involving software execution.

During an automatic trigger event determining step 810, the debugger determines automatically that a trigger event 812 having a description 210 associated with an extension has occurred in the debugger's execution environment 214. In FIG. 7, the event in step 702 when X.DLL is loaded is an example of a trigger event 812.

During a load condition determining step 814, the debugger 136 determines automatically that a load condition 212 associated with an extension has been met by debuggee variables or other debuggee state information 218.

In a given embodiment, trigger events and load conditions may overlap. A distinction made herein is that trigger events deal, primarily if not exclusively, with events or conditions occurring outside a debuggee while load conditions deal with events or conditions occurring inside a debuggee. But it will be appreciated that this distinction need not be made in every embodiment. Automatic loading may be triggered by information that originates outside the debuggee, inside the debuggee, or both.

During an automatic loading step 816, the extension corresponding to a triggered event is loaded into memory for use within or in conjunction with the debugger 136. In FIG. 7, step 702 wherein the debuggee loads X.DLL is a trigger event which triggers an automatic loading step 816 leading to the memory configuration shown in state V of FIG. 7 with extension P-EXTENSION 706 loaded in the debugger 136.

With continued reference to FIG. 8, during an informing step 818 the debugger is automatically informed that the extension has been loaded and now is available for use within the debugger. In the example discussed above involving the Visual Studio® Debugger, for instance, the debugger 136 performs informing step 818 by raising an ExtensionLoadedEvent event 704 to the debugger user interface 302 informing the user interface that a new extension has been loaded.

During a control passing step 820, control is passed to the loaded extension. Step 820 may be accomplished using procedure invocation or another familiar mechanism for passing control from one piece of software to another.

Some embodiments provide a method which may be used by a programming model developer 220 to help application developers 222 and other software developers configure a debugger 136 for debugging software that was written using a particular programming model 502. The method includes providing 802 a debugger extension 202 which includes debugger viewing routines 208 that are specific to the programming model 502, for viewing state information 218 of a debuggee 216 program while using a debugger 136. The programming model may be within one or more of the example categories listed herein, or it may be in some other category of programming models. The method also includes publishing 804 the debugger extension together with a description 210 of a debugger environment trigger event 812, thereby allowing automatic loading 816 of the debugger extension for use with a debugger in response to occurrence of the trigger event in the debugger's execution environment 214.

In some embodiments, the method further includes publishing 806 a debuggee program state load condition 212 with the debugger extension 202 and the trigger event, thereby allowing automatic loading 816 of the debugger extension into the debugger 136 in response to the trigger event only if the load condition is met by state information 218 in the debuggee program.

In some embodiments, the providing step 802 provides the debugger extension in a first format which is compatible with a first debugger 136, and the method further includes providing 802 a second debugger extension 202 which also includes debugger viewing routines that are specific to the programming model, with the second debugger extension being provided in a second format which is compatible with a second debugger. That is, the debugger extension 202 functionality for a given programming model 502 can be made available in different formats to different debuggers.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using components such as a debugger extension 202 and database 204, in the form of corresponding data 118 and instructions 116, read from a removable medium 114 and/or another source such as a network connection, to thereby form a configured medium in the form of configured memory 112 which is capable of causing a computer system to perform method steps for configuring software and/or for providing automatically available debugging and/or programming-model-specific debugging capabilities as disclosed herein. FIGS. 1 through 7 thus help illustrate configured storage media embodiments and method embodiments, as well as system embodiments.

Some embodiments provide a storage medium 114 configured with computer data 118 and computer instructions 116 for automatic loading 816 of one or more extensions 202, 402 for a debugger 136. The method includes automatically reading 808 a record 206 which associates a description 210 of a debugger environment trigger event 812 with an identification of an extension 202, 402 for a debugger 136. Then the method automatically determines 810 that the trigger event has occurred, and then automatically loads 816 the extension for use with the debugger. In some embodiments, the method further includes automatically reading 808 a description of a debuggee program state load condition 212 and automatically determining 814 that the load condition is met, prior to automatically loading 816 the extension 202, 402 for use with a debugger.

The reading step may automatically read 808 at least one of the following as a record 206: a key-value pair, a system registry entry, a persistent debugger extension database entry. The reading step may automatically read 808 at least one of the following in the identification of the extension: a dynamic library file name, a class ID. As with other steps, the reading step may be repeated. For instance, in a variation the method automatically reads 808 identifications of at least three debugger extensions.

In some embodiments, the reading step automatically reads 808 a name of a named portion of a debuggee 216 program as the description of a debugger environment trigger event, the trigger event 812 is the loading of the named portion of the debuggee program, and the loading step automatically loads 816 the extension 202, 402 in response to the loading of the named portion of the debuggee program. For example, a debugger extension can be automatically loaded 816 whenever a programming-model-specific DLL is loaded, regardless of the value of the debuggee program's variables, instruction pointer, or other debuggee state information 218. In some embodiments, the method further includes automatically informing 818 the debugger 136 that an extension 202, 402 has been loaded for use with the debugger.

More generally, any of the method steps illustrated in FIG. 8, or otherwise taught herein, may be used to help configure a storage medium to thereby form a configured medium embodiment.

Conclusion

As described herein, some embodiments provide various tools and techniques to enter programming-model-specific debugger extensions 202 in a registry 126 or other database 204, thereby allowing automatic loading 816 of such extensions. Thus, an application 120 can be debugged using automatically identified and automatically installed debugging capabilities provided specifically by knowledgeable developers for programming models 502 used in the debuggee program.

Although particular embodiments are expressly illustrated and described herein as methods, configured media, or systems, it will be appreciated that discussion of one type of embodiment also generally extends to other embodiment types. For instance, the descriptions of methods in connection with FIGS. 6 through 8 also help describe configured media, as well as the operation of systems like those described in connection with FIGS. 1 through 7. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used to help application developers and other software developers configure a debugger for debugging software that was written using a particular programming model, the method comprising the steps of:
providing a debugger that is architected to be extended by a debugger extension which includes debugger viewing routines that are specific to the particular programming model, the debugger extension providing functionality for viewing state information of a debuggee program while using the debugger, the particular programming model being one of multiple programming models, including programming models applicable with multiple programming languages which are not necessarily the same programming languages for each of the programming models, the particular programming models being within at least one of the following categories: coroutine programming models, multicore programming models, parallel programming models, game development programming models, custom hardware programming models, GUI programming models, presentation programming models, event-driven programming models, messaging framework programming models, wide area network programming models, web application programming models, rich internet application programming models, handheld device programming models, cell phone programming models, database programming models, managed execution environment programming models, native code programming models, script programming models; and configuring the debugger to recognize debugger environment trigger event, thereby allowing automatic loading of the debugger extension for use with the debugger in response to occurrence of the trigger event in the debugger's execution environment.

2. The method of claim 1, further comprising providing a debugger extension which includes debugger viewing routines that are specific to a particular programming model which is within at least one of the following categories: parallel programming models, game development programming models, custom hardware programming models, GUI programming models, presentation programming models, event-driven programming models, messaging framework programming models, wide area network programming models, web application programming models, rich internet application programming models, handheld device programming models, cell phone programming models, database programming models.

3. The method of claim 1, further comprising publishing a debuggee program state load condition, thereby allowing automatic loading of the debugger extension into the debugger in response to the trigger event only if the load condition is met by state information in the debuggee program.

4. The method of claim 1, wherein the method comprises providing the debugger extension in a first format which is compatible with a first debugger, and the method further comprises providing a second debugger extension which also includes debugger viewing routines that are specific to the programming model.

5. A computer system configured for automatic loading of a programming model-specific debugger extension, the system comprising:
a memory;
a logical processor in operable communication with the memory;
a debugger which is configured to determine whether a debugger environment trigger event has occured; and
the debugger also configured to communicate with a first debugger extension which includes first debugger viewing and manipulation routines that are specific to a first particular programming model and designed for viewing and manipulating state information of a debuggee program via the debugger, and a second debugger extension which includes second debugger viewing and manipulation routines that are specific to a second particular programming model and designed for viewing and manipulating state information of the debuggee program via the debugger, each of the particular programming models being one of multiple programming models, at least one of the particular programming models being applicable with multiple programming languages, each of the particular programming models being within at least one of the following categories and the programming models also differing with respect to at least one of these categories: multicore programming models, parallel programming models, game development programming models, custom hardware programming models, messaging framework programming models, web application programming models, handheld device programming models, cell phone programming models, database programming models, managed execution environment programming models, native code programming models, script programming models.

6. The system of claim 5, wherein the debugger is further configured to automatically load the debugger extension and pass control to the debugger extension, in response to an occurrence of the trigger event.

7. The system of claim 5, wherein the debugger is further configured to determine whether a debuggee program state load condition is met, and to automatically load the debugger extension and pass control to the debugger extension, after the trigger event occurs and the load condition is met.

8. The system of claim 5, further comprising in memory the first debugger extension which includes debugger viewing and manipulation routines that are specific to the first programming model.

9. The system of claim 5, further comprising in memory the debuggee program, wherein the debuggee program comprises a first portion implemented using a first programming model and a second portion implemented using a second programming model, wherein the debugger extension includes debugger viewing and manipulation routines that are specific to the first programming model.

10. The system of claim 5, wherein the system comprises a persistent debugger extension database, which identifies debugger extensions and corresponding trigger events.

11. The system of claim 10, wherein the persistent debugger extension database is part of a system registry.

12. The system of claim 5, wherein the debugger comprises:
a user interface;
at least one engine manager located below the user interface, that is, located in terms of debugging data and control flow somewhere between the user interface and the debuggee program;
at least one engine located below the engine manager; and
wherein the debugger extension is loaded at a location between the engine manager and the debuggee program.

13. The system of claim 12, wherein the debugger comprises a native code engine for a native code execution environment and a managed code engine for a managed code execution environment, and wherein a native code debugger extension is loaded below the engine manager for viewing and manipulating state information of debuggee program code which runs in the native code execution environment, and a managed code debugger extension is loaded below the engine manager for viewing and manipulating state information of debuggee program code which runs in the managed code execution environment.

14. A computer-readable memory configured with computer data and computer instructions for automatic loading of one or more extensions for a debugger, the method comprising:
automatically associating a description of a debugger environment trigger event with an identification of an extension for a debugger;
automatically determining that the trigger event has occurred; and then
automatically loading the extension for use with the debugger, the debugger extension including debugger viewing routines that are specific to a particular programming model, for viewing state information of a debuggee program while using a debugger, the particular programming model being one of multiple programming models, the particular programming model being applicable with multiple programming languages the particular programming model being within at least one of the following categories: coroutine programming models, multicore programming models, parallel programming models, game development programming models, custom hardware programming models, GUI programming models, presentation programming models, event-driven programming models, messaging framework programming models, wide area network programming models, web application programming models, rich internet application programming models, handheld device programming models, cell phone programming models, database programming models, managed execution environment programming models, native code programming models, script programming models.

15. The computer-readable memory of claim 14, wherein the method further comprises automatically reading a description of a debuggee program state load condition and automatically determining that the load condition is met, prior to automatically loading the extension for use with a debugger.

16. The computer-readable memory of claim 14, wherein the associating includes reading at least one of the following: a key-value pair, a system registry entry, a persistent debugger extension database entry.

17. The computer-readable memory of claim 14, wherein the associating includes reading at least one of the following in the identification of the extension: a dynamic library file name, a class ID.

18. The computer-readable memory of claim 14, wherein the method reads a name of a named portion of a debuggee program as the description of a debugger environment trigger event, the trigger event is the loading of the named portion of the debuggee program, and the loading step automatically loads the extension in response to the loading of the named portion of the debuggee program.

19. The computer-readable memory of claim 14, wherein the method automatically reads identifications of at least three debugger extensions.

20. The computer-readable memory of claim 14, wherein the method further comprises automatically informing the debugger that a debugger extension has been loaded for use with the debugger.

* * * * *